Figure 1:
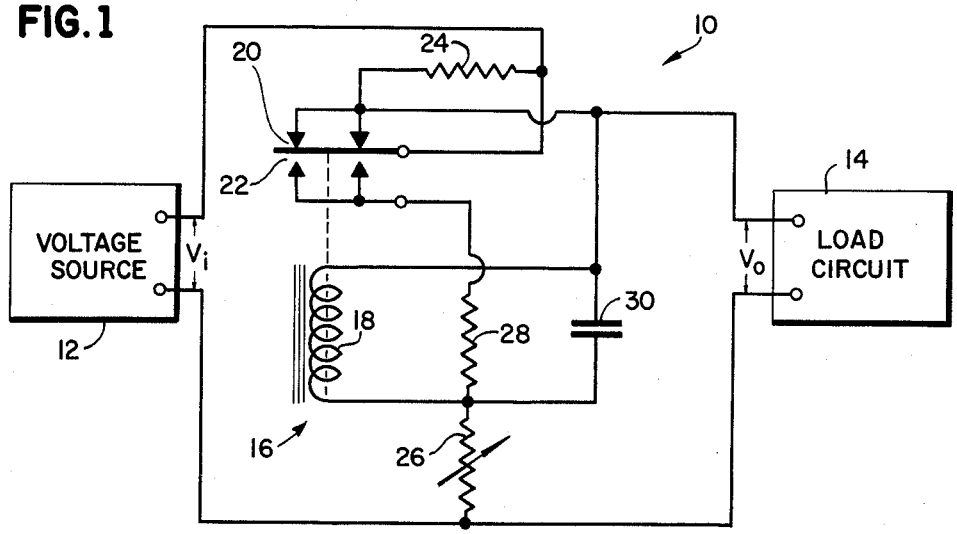

Aug. 28, 1962 R. S. WEDGEWOOD 3,051,890
VOLTAGE REGULATOR CIRCUIT
Filed May 19, 1959

INVENTOR.
ROBERT S. WEDGEWOOD
BY
Mason, Kolehmainen, Rathburn and Wyss
ATTORNEYS United States Patent Office 3,051,890
Patented Aug. 28, 1962

3,051,890
VOLTAGE REGULATOR CIRCUIT
Robert S. Wedgewood, Toronto, Ontario, Canada, assignor to C. P. Clare Canada Ltd., Toronto, Ontario, Canada, a corporation of Canada
Filed May 19, 1959, Ser. No. 814,295
2 Claims. (Cl. 323—66)

This invention relates to a voltage regulating arrangement and, more particularly, to a voltage regulating circuit including a mercury relay.

In many types of mobile equipment, the electronic apparatus carried thereon is operated from direct current energy sources that provide output voltages of varying magnitudes. As an example, in mobile radio receivers used in police vehicles and taxis, the filaments of the tubes in the receiver are heated by a generator charged battery that often provides voltages of varying magnitudes or voltage surges that can adversely affect the useful life of the tubes. It would be desirable to provide devices or circuits for preventing the application of voltage surges to the filaments and for also insuring that an average direct current voltage of a predetermined magnitude is applied to the load. However, because of the necessity of reducing the physical size and the cost of these receivers, it has not previously been feasible to use known voltage regulating arrangements of types that are capable of providing both adequate regulation and a long enough useful life without unduly increasing the size and cost of the receiver. This is particularly true of regulating arrangements using electromechanical relays with dry metallic contacts which have a relatively short useful life and radically variable contact resistance.

Accordingly, one object of the present invention is to provide a new and improved voltage regulating circuit.

Another object is to provide a voltage regulating circuit which is easily and economically constructed and which requires a minimum of installation space.

A further object is to provide a voltage regulating circuit including a mercury switch as the only operating component therein.

Another object is to provide a voltage regulating arrangement in which the "operate" and "release" times of a mercury switch are varied in accordance with the magnitude of the voltage supplied by a source in order to supply a regulated voltage of a predetermined magnitude to a load.

In accordance with these and many other objects, an embodiment of the invention comprises a voltage source, such as a generator charged battery, which is connected to a load circuit, such as a group of parallel connected filaments, through a normally closed and mercury-wetted first pair of contacts on a mercury relay or switch. The winding of the switch is connected across the voltage source, and the current flow through the winding is adjusted so that the mercury relay operates when the voltage of the source equals or exceeds the predetermined magnitude that is to be applied to the load circuit. A resistor is shunted across the first pair of contacts so that, when the relay operates, the value of the voltage applied to the load from the source is reduced. The mercury switch also includes a second or normally open pair of contacts which, when closed by the operation of the relay, reduces the potential applied across the winding of the relay so as to cause its release. A capacitor is also shunted across the winding of the relay.

When the voltage source applies a voltage to the load which is slightly in excess of the predetermined or nominal value which is to be supplied to the load, the relay operates to place the resistor in series between the source and the load so as to reduce the voltage applied to the load.

The operation of the relay, by closing the normally open contacts, causes the release of the mercury relay. The mercury relay continues to operate and release so that the resistance means is connected into and out of the series circuit relation between the voltage source and the load. Thus, the average value of the voltage applied to the load is reduced as soon as the voltage supplied by the source exceeds the nominal value by even a small amount.

When the value of the voltage exceeds the nominal value by a greater amount, the mercury relay is operated in a shorter period of time inasmuch as the application of voltages of increasing magnitudes to the winding thereof decreases the "operate" time of this relay. In a similar fashion, as the magnitude of the voltage supplied from the source increases to higher values, the capacitor shunted across the winding of the relay has an appreciable effect on the "release" time of the relay so that the relay remains operated for longer periods of time following its operation. Since the application of increasing voltages to the winding of the mercury relay decreases the "operate" time and increases the "release" time, the normally closed contacts remain closed for shorter periods of time and remain open for longer periods of time. Thus, the resistance is connected in series between the voltage source and the load for an overall greater interval of time during each cycle of operation of the relay so that the average value of the voltage supplied to the load is reduced as the magnitude of the voltage from the source is increased. Accordingly, the mercury relay provides regulation over the voltage supplied from the source to the load over a selected range. At the end of this range, the delay in the release of the mercury switch due to the capacitor becomes so large that the voltage supplied to the load increases in a linear relationship with the voltage from the source, and the mercury relay is no longer effective to regulate the output voltage.

Accordingly, the voltage regulator circuit embodying the present invention includes a mercury relay as a sole operating component therein and thus is economical to fabricate and requires a minimum of installation space. The use of the delay capacitor and the characteristics of the mercury relay by which the "operate" time is decreased with increased operating voltages permit the cyclic operation and release of the mercury relay to effectively regulate the voltage supplied from the source to the load over a useful range of input voltages. In addition, because of the virtually unlimited life of the mercury-wetted contacts and the uniform resistance characteristics thereof, the mercury relay can be used as a control element interposed between the voltage source and the load to provide uniform regulation characteristics that can not be achieved by prior devices using electromechanical relays in which the dry metallic contacts prevent uniform regulation of the voltages supplied to a load circuit.

Figure 2:
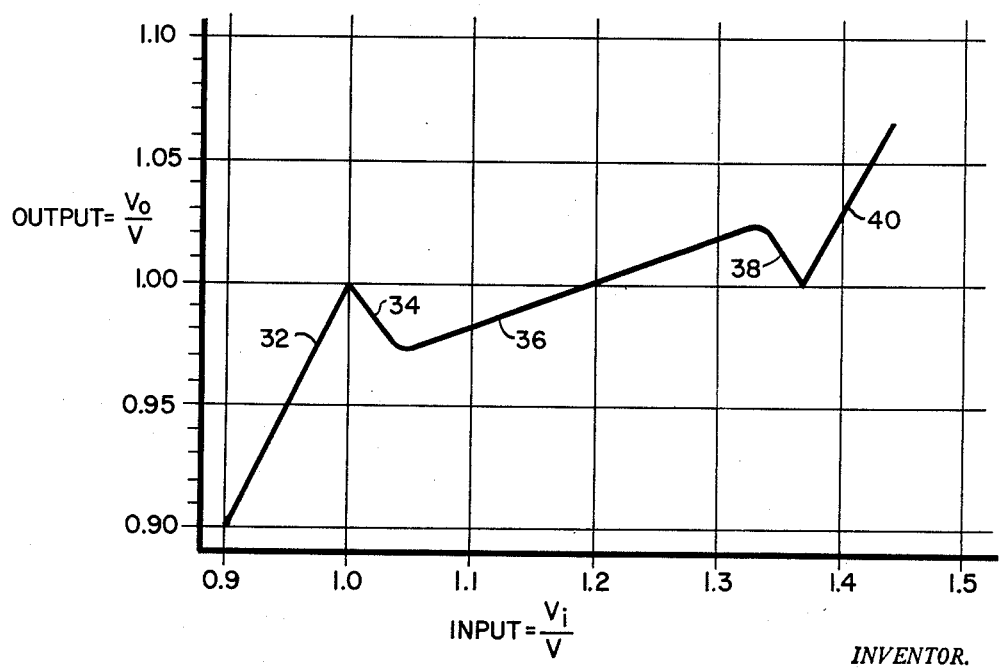

Many other objects and advantages of the present invention will become apparent from the following description when considered in conjunction with the drawings in which:

FIG. 1 is a schematic circuit diagram of a voltage regulator circuit embodying the present invention; and FIG. 2 is a normalized curve of the regulation characteristic of the circuit shown in FIG. 1.

Referring now more specifically to FIG. 1 of the drawings, therein is shown a voltage regulator circuit, indicated generally as 10, which embodies the invention and which is connected between a voltage source 12 and a load circuit 14. The voltage source 12, which can comprise any suitable means such as a generator charged battery, provides a direct current input voltage $V_i$ to the regulator circuit 10. This voltage varies over an appreciable range of values and includes voltage surges which adversely affect the proper operation of the load circuit 14. As an example, the load circuit 14 can comprise a plurality of parallel connected filaments to which a regulated direct current output voltage $V_o$ is supplied by the circuit 10.

The voltage regulator circuit 10 comprises a mercury switch or relay, indicated generally as 16, including a winding 18, a pair of normally closed contacts 20, and a pair of normally open contacts 22. The mercury relay or swtich 16 can be of any of the types well known in the art, but preferably is a type "HG-1053" switch manufactured by C. P. Clare & Company of Chicago, Illinois. This relay has the characteristic that its "operate" time, i.e., the time required to actuate the contacts 20 and 22 to their alternate positions following the application of a threshold operating voltage, decreases as the magnitude of the applied voltage exceeds the threshold level. As an example, as the value of the voltage supplied to the winding 18 increases from the threshold value to a higher value, the "operate" time of the relay 16 is decreased from six milliseconds to around three milliseconds. The pairs of contacts 20 and 22, although shown in conventional schematic form, include fixed contacts which are wetted with mercury supplied from a capillary type armature that is moved into and out of engagement with the fixed contacts. Because of this mercury wetting and the use of a sealed enclosure or envelope for the switch components, the effective life of the relay 16 is virtually unlimited and the contact resistance of the pairs of contacts 20 and 22 remains uniform throughout the effective life of this relay.

These characteristics of the mercury relay 16 are used in regulating the magnitude of the voltage supplied by the source 12 to the load circuit 14. More specifically, the normally closed pair of contacts 20 is connected in series between one terminal of the voltage source 12 and one terminal of the load circuit 14. The other terminal of the voltage source 12 and the load circuit 14 are connected directly together. Thus, the voltage of the source 12 is normally applied directly to the load circuit 14. The contacts 20 are shunted by a resistor 24 so that, when the contacts 20 are opened, the resistor 24 is connected in series between the voltage source 12 and the load circuit 14 to reduce the magnitude of the voltage supplied to the load circuit. The circuit 10 regulates the average value of the voltage applied to the load circuit 14 by controlling the operation of the mercury switch 16 so that the periods during which the contacts 20 are opened and closed is varied in accordance with the magnitude of the input voltage $V_i$ supplied by the voltage source 12.

In order to provide means for operating the mercury switch 16, the winding 18 is connected across the output of the voltage source 12 in series with an adjustable resistor 26. The value of the resistance 26 is adjusted so that, when the input voltage $V_i$ supplied by the source 12 just exceeds a predetermined or nominal voltage which should be applied to the circuit 12, the flow of current through the contacts 20, the winding 18, and the variable resistor 26 is sufficient to cause the relay 16 to operate. The setting of the adjustable resistance 26 is varied in accordance wtih the nominal voltage to be applied to the load circuit 14.

To provide means for automatically releasing the mercury relay 16 in response to each operation thereof, the normally open contacts 22 are connected between one side of the voltage source 12 and one terminal of the winding 18 through a circuit including a resistor 28. When the relay 16 is operated to close the contacts 22, one side of the winding 18 is connected to one terminal ofthe voltage source 12 through the resistor 24, and the other side of the winding 18 is connected to this same terminal of the source through the closed contacts 22 and the resistor 28. This reduces the voltage across the winding 18 so that the relay 16 is released. A capacitor 30 shunted across the terminals of the winding 18 is provided for selectively delaying the release of the relay 16 following the closure of the contacts 22, thereby to increase the "release" time of this relay. The capacitor 30 is normally charged over a circuit including the closed contacts 20 and the adjustable resistor 26. However, when the relay 16 operates to open the contacts 20 and to close the contacts 22, the capacitor 30 discharges through the winding 18 to delay the release of the relay 16. The length of the interval during which the release of the relay 16 is delayed is dependent on the charge on the condenser 30, which, in turn, is dependent on the voltage $V_i$ applied to the capacitor 30 through the closed contacts 20.

FIGURE 2 of the drawings illustrates a normalized curve of the regulation characteristic of the circuit 10 in which the ratio between the voltage input $V_i$ to the regulator circuit 10 and the nominal or predetermined voltage V to be applied to the load circuit 14 is plotted as an abscissa and the ratio between the output voltage $V_o$ of the regulator circuit 10 and the nominal voltage V is plotted as an ordinate. The values plotted in the graph shown in FIG. 2 are based on the average D.C. values of the various voltages and do not represent the instantaneous values thereof.

Referring now more particularly to the operation of the circuit 10 in conjunction with the regulation characteristic illustrated in FIG. 2, the input voltage $V_i$ is applied through the normally closed contacts 20 to the load circuit 14 as long as the value of $V_i$ is less than the value of V. Thus, the output voltage V rises in direct proportion to the input voltage $V_i$ as illustrated at 32 (FIG. 2).

When the input voltage $V_i$ equals or just exceeds the value of the nominal voltage V that is to be applied to the load circuit 14, the relay 16 operates to open the contacts 20 and to close the contacts 22. The opening of the contacts 20 places the resistor 24 in series between the voltage source 12 and the load circuit 14 to reduce the magnitude of the voltage supplied to this load circuit. The closing of the contacts 22 reduces the voltage across the winding 18 so that the relay 16 releases to again close the contacts 20 and to open the contacts 22. The closure of the contacts 20 again connects the voltage source 12 directly to the load circuit 14. As long as the value of the voltage $V_i$ remains at a value equal to or slightly above the nominal value V, the mercury relay 16 continues to operate and release in this manner.

This intermittent operation and release of the relay 16 when the value of the input voltage $V_i$ is in the range just above the value of the nominal voltage V produces the abrupt drop in the output voltage $V_o$ illustrated at 34 (FIG. 2). This portion of the characteristic curve is due to the fact that the mercury relay 16 requires a finite time of around three to five milliseconds to restore the contacts 20 and 22 to their normal conditions after the current passing through the winding 18 drops below the value necessary to hold the relay operable. This delay is inherent in the relay 16 and is not due, in any appreciable part, to the effect of the capacitor 30. The value of the resistance 24 is such that, when the relay 16 is maintained operated following its operation for this period of time, the average value of the direct current voltage $V_o$ is reduced more than is necessary to compensate for the small amount by which the input voltage $V_i$ exceeds the nominal voltage V. Thus, the output voltage $V_o$ drops to a value below the nominal voltage V, as indicated at 34. The relay 16 operates at a frequency of around one to five cycles per second in this portion of the curve.

As the input voltage $V_i$ continues to increase, the increased voltage applied to the operating winding 18 reduces the "operate" time thereof so that the relay 16 operates in shorter periods of time. This reduces the length of the period during which the contacts 20 are closed. The increased voltage applied to the condenser 30 during the intervals in which the contacts 20 are closed increases the charge on the capacitor 30 so that the capacitor now begins to delay the release of the relay 16 by discharging the accumulated charge through the winding 18 when the contacts 22 are opened. Thus, the length of the "operate" time is decreased and the length of the "release" time is increased. This means that the contacts 20 remain closed to connect the voltage source 12 directly to the load circuit 14 for a shorter interval of time during each operation of the relay 16 and that the contacts 20 remain open to connect the resistor 24 between the voltage source 12 and the load circuit 14 for a greater period of time during each cycle of operation of the relay. These opposite effects provide a generally linear increase in value of the output voltage $V_o$ in response to an increase in the value of the input voltage $V_i$. However, this change takes place at a rate such that substantial increases in the input voltage $V_i$ result in small increases in the output voltage $V_o$, as illustrated by a portion 36 of the regulation curve shown in FIG. 2. During this portion, the relay 16 operates with a relatively steady frequency of around twenty cycles per second and the frequency of operation is not appreciably varied by an increase in input voltage.

As the input voltage $V_i$ continues to increase, a point is attained at which the "operate" time of the relay 16 is no longer reduced as the applied voltage increases. However, the increasing input voltage $V_i$ increases the charge on the capacitor 30 so that the time required to release the relay 16 is increased. This increase in the "release" time of the relay 16 produces a reverse slope portion 38 of the characteristic curve. During this portion of the operating characteristic of the circuit 10, the operating frequency of the relay 16 again drops to a range between one to five cycles per second, as in the portion 34 of the characteristic curve.

As the value of the input voltage $V_i$ increases, the magnitude of the voltage across the winding 18 when the contacts 22 are closed increases to a point above the value necessary to hold the relay operated. At this time, the relay 16 ceases to release. With the contacts 20 maintained in an open condition, the resistor 24 remains connected in series between the voltage source 12 and the load circuit 14, and all further increases in the input voltage $V_i$ appear as increases in the output voltage $V_o$. This direct proportionality between the increase in the input voltage $V_i$ and the output voltage $V_o$ is illustrated at 40 (FIG. 2).

Thus, the voltage regulator circuit 10, which requires only a single mercury relay or switch 16, provides an economical and easily assembled means for regulating the output voltage $V_o$ supplied to the load circuit 14 over a fairly wide range of variation in the input voltage $V_i$. The circuit 10 requires a small amount of physical space and is capable of providing good voltage regulation over an extended period of time because the mercury-wetted contacts 20 and 22 retain uniform contact resistance characteristics over a virtually unlimited life span. As an example, one voltage regulator circuit 10 that was constructed in accord with the present invention to regulate a twelve to sixteen volt supply used components having the following values. It is obvious however, that the components can have values other than those listed below in dependence on the related circuits with which the regutor circuit 10 is used.

Resistor 24_____ .85 ohms.
Adjustable resistor 26___ A 180 ohm resistor in series with a 200 ohm potentiometer.
Resistor 28_____ 680 ohms.
Capacitor 30_____ 50 μfd.

In the voltage regulator circuit 10 constructed with components of the values listed above, the relay 16 is of the type identified above and includes a winding 18 having a resistance of 200 ohms.

Although the present invention has been described with reference to a single embodiment thereof, it will be understood that those skilled in the art can make many other modifications and embodiments which will fall within the spirit and scope of the principles of this invention.

What is claimed and desired to be secured by Letters Patent of the United States is:

1. A circuit for regulating the voltage supplied to a load circuit from a voltage source; comprising a mercury relay having a winding, a first pair of normally closed contacts, and a second pair of normally open contacts; first circuit means including said first pair of contacts for connecting said load to said source; first resistance means shunted across said first pair of contacts; second circuit means connecting said winding across said source; second resistance means included in said second circuit means for adjusting said winding to operate said relay only when a voltage equal to or greater than a predetermined value is supplied by said source; capacitive means shunted across said winding to delay the release of said relay; and third circuit means including said second pair of contacts for reducing the voltage applied to said winding when said relay operates so as to cause the release of said relay after a time interval determined by said capacitive means and by the magnitude of the voltage supplied by said source.

2. The circuit set forth in claim 1 in which said third circuit means includes means connecting said second pair of contacts to said winding.

References Cited in the file of this patent
UNITED STATES PATENTS

| | | |
|---|---|---|
| 2,381,250 | Baumann | Aug. 7, 1945 |
| 2,509,252 | Salazar | May 30, 1950 |
| 2,957,117 | Lapuyade | Oct. 18, 1960 |